(12) United States Patent
Jia et al.

(10) Patent No.: US 10,749,963 B2
(45) Date of Patent: Aug. 18, 2020

(54) METHOD AND APPARATUS FOR CONTROLLING INTERNET OF THINGS DEVICES

(71) Applicant: CHINA UNITED NETWORK COMMUNICATIONS GROUP COMPANY LIMITED, Beijing (CN)

(72) Inventors: Xiongwei Jia, Beijing (CN); Binfeng Yan, Beijing (CN)

(73) Assignee: CHINA UNITED NETWORK COMMUNICATIONS GROUP COMPANY LIMITED, Beijing (CN)

( * ) Notice: Subject to any disclaimer, the term of this patent is extended or adjusted under 35 U.S.C. 154(b) by 103 days.

(21) Appl. No.: 15/870,753

(22) Filed: Jan. 12, 2018

(65) Prior Publication Data
US 2018/0139286 A1    May 17, 2018

Related U.S. Application Data

(63) Continuation of application No. PCT/CN2016/109808, filed on Dec. 14, 2016.

(30) Foreign Application Priority Data

Mar. 8, 2016   (CN) .......................... 2016 1 0131316

(51) Int. Cl.
*H04L 29/08*        (2006.01)
*H04L 29/06*        (2006.01)

(52) U.S. Cl.
CPC ............ *H04L 67/125* (2013.01); *H04L 29/08* (2013.01); *H04L 63/00* (2013.01); *H04L 63/0876* (2013.01); *H04L 67/40* (2013.01)

(58) Field of Classification Search
CPC .................................................. H04L 67/125
(Continued)

(56) References Cited

U.S. PATENT DOCUMENTS 7,209,963 B2 * 4/2007 Burton ................ H04L 41/0681
                                                   709/223
8,271,116 B2    9/2012 Lu ................................... 700/94
(Continued)

FOREIGN PATENT DOCUMENTS

CN          102736599 A       10/2012
CN          104363154 A   *   2/2015
(Continued)

OTHER PUBLICATIONS

Bioozhun.org, "Information Technology—Radio Frequency Identification—Air Interface Protocol at 800/900 MHz", 2014 (Year: 2014).*

(Continued)

*Primary Examiner* — Ondrej C Vostal
(74) *Attorney, Agent, or Firm* — J.C. Patents

(57) ABSTRACT

A method and an apparatus for controlling internet of things devices. The method includes: receiving a control instruction configured to control the internet of things devices and sent by a control application, where the control instruction includes an identification number of the control application and identification numbers of a plurality of internet of things devices; determining, according to the control instruction, whether the control application has authority to access the internet of things devices; sending the control instruction to the internet of things devices to enable the internet of things devices to execute the control instruction when it is determined that the control application has the authority to access the internet of things devices. Compared to a case where each internet of things device is corresponding to a control application specific thereto, efficiency of control of an intelligent terminal over the internet of things devices is improved.

10 Claims, 9 Drawing Sheets

(58) Field of Classification Search
USPC .......................................................... 709/223
See application file for complete search history.

(56) References Cited

U.S. PATENT DOCUMENTS

| | | | | |
|---|---|---|---|---|
| 9,009,230 | B1* | 4/2015 | Matthieu | H04L 69/08 709/204 |
| 9,071,657 | B2* | 6/2015 | Li | H04L 67/34 |
| 9,094,407 | B1* | 7/2015 | Matthieu | H04W 4/70 |
| 9,503,902 | B1* | 11/2016 | Coney | H04W 76/10 |
| 10,115,092 | B1* | 10/2018 | Bryan | G06Q 20/123 |
| 2004/0010716 | A1* | 1/2004 | Childress | G06F 11/0748 709/223 |
| 2007/0192462 | A1* | 8/2007 | Bae | H04L 12/2809 709/223 |
| 2007/0192477 | A1* | 8/2007 | Hicks, III | H04L 69/329 709/223 |
| 2009/0031293 | A1* | 1/2009 | Marsala | G06F 9/548 717/165 |
| 2009/0049518 | A1* | 2/2009 | Roman | H04L 41/0893 726/1 |
| 2011/0162036 | A1* | 6/2011 | Heo | G06F 21/608 726/1 |
| 2011/0202932 | A1* | 8/2011 | Borghini | G06F 9/54 719/321 |
| 2012/0284777 | A1* | 11/2012 | Eugenio | H04W 4/24 726/4 |
| 2014/0269593 | A1* | 9/2014 | Wang | H04W 72/12 370/329 |
| 2015/0006695 | A1* | 1/2015 | Gupta | H04W 4/70 709/223 |
| 2015/0006696 | A1* | 1/2015 | Hershberg | H04L 67/12 709/223 |
| 2015/0019710 | A1* | 1/2015 | Shaashua | G06F 16/35 709/224 |
| 2015/0039743 | A1* | 2/2015 | Van Wie | H04L 67/38 709/223 |
| 2015/0319176 | A1* | 11/2015 | Yahalom | G06F 21/31 726/3 |
| 2015/0341446 | A1* | 11/2015 | Nguyen | H04L 67/16 709/223 |
| 2016/0065653 | A1* | 3/2016 | Chen | H04L 67/10 715/735 |
| 2016/0105319 | A1* | 4/2016 | Meeker | H04L 41/082 709/204 |
| 2016/0174266 | A1* | 6/2016 | Goel | H04W 4/70 455/509 |
| 2016/0285979 | A1* | 9/2016 | Wang | H04L 67/16 |
| 2016/0335542 | A1* | 11/2016 | Dandekar | G06F 13/36 |
| 2017/0147808 | A1* | 5/2017 | Kravitz | G06F 21/45 |
| 2017/0149792 | A1* | 5/2017 | Smith | H04L 9/3263 |
| 2017/0163957 | A1* | 6/2017 | Anderson | G01S 3/046 |
| 2017/0180348 | A1* | 6/2017 | Piccolotto | G06K 9/00906 |
| 2017/0180480 | A1* | 6/2017 | Yang | H04L 67/12 |
| 2017/0220633 | A1* | 8/2017 | Porath | G06F 9/542 |
| 2017/0235603 | A1* | 8/2017 | Baughman | H04W 4/70 718/105 |
| 2017/0257223 | A1* | 9/2017 | Persson | H04W 4/70 |
| 2017/0257767 | A1* | 9/2017 | Zhao | H04W 4/70 |
| 2017/0373855 | A1* | 12/2017 | Pritchard | H04L 29/08 |
| 2018/0176079 | A1* | 6/2018 | Teo | H04W 76/40 |
| 2018/0196973 | A1* | 7/2018 | Sun | G06K 17/00 |
| 2018/0269937 | A1* | 9/2018 | Lu | H04W 72/02 |

FOREIGN PATENT DOCUMENTS

| | | | | |
|---|---|---|---|---|
| CN | 104363154 | A | | 2/2015 |
| CN | 104574587 | A * | | 4/2015 |
| CN | 104574587 | A | | 4/2015 |
| CN | 104683299 | A | | 6/2015 |
| CN | 104811444 | A * | | 7/2015 |
| CN | 104811444 | A | | 7/2015 |
| CN | 104867222 | A | | 8/2015 |
| CN | 104867222 | A * | | 8/2015 |
| CN | 104993981 | A | | 10/2015 |
| CN | 204706085 | U * | | 10/2015 |
| CN | 204706085 | U | | 10/2015 |
| CN | 105827691 | A | | 8/2016 |
| CN | 105827691 | A * | 8/2016 | H04L 63/0876 |
| EP | 2 563 092 | A1 | | 2/2013 |
| EP | 2563092 | A1 * | 2/2013 | H04L 67/34 |
| WO | 2015/131689 | A1 | | 9/2015 |

OTHER PUBLICATIONS

Floerkemeier, "Transmission Control Scheme for Fast RFID Object Identification", 2006 (Year: 2006).*
Li, "Method and System for Implementing Internet of Things Service", Apr. 2010 (Year: 2010).*
Liu, "System Performance Analysis for GB/T 29768 RFID System", Jan. 2015 (Year: 2015).*
Chen et al., "A Cooperative Web Framework of Jini into OSGi-based Open Home Gateway", 2005 (Year: 2005).*
Cotroneo et al., "A Jini Framework for Distributed Service Flexibility", 2002 (Year: 2002).*
OSGi Alliance, "About the OSGi Service Platform", Revision 4.1, 2007 (Year: 2007).*
OSGi Service Platform, "Interface Framework", Release 4, Version 4.2, 2010 (Year: 2010).*
International Search Report of corresponding International PCT Application No. PCT/CN2016/109808, dated Mar. 23, 2017.
The extended European Search Report of corresponding European patent application No. 16893319.0-1218/3319299, dated Oct. 26, 2018.
The Chinese First Examination Report of corresponding China patent application No. 201610131316.3, dated Jun. 5, 2018.
The European Communication Pursuant to Article 94(3) EPC of corresponding European application No. 16 893 319.0-1218, dated Jan. 31, 2020.

* cited by examiner

METHOD AND APPARATUS FOR CONTROLLING INTERNET OF THINGS DEVICES

CROSS-REFERENCE TO RELATED APPLICATIONS

This application is a continuation of International Application No. PCT/CN2016/109808, filed on Dec. 14, 2016, which claims priority to Chinese Patent Application No. 201610131316.3, filed on Mar. 8, 2016. The disclosures of the aforementioned applications are hereby incorporated by reference in their entirety.

TECHNICAL FIELD

Embodiments of the present invention relate to communication technologies and, in particular, to a method and an apparatus for controlling internet of things devices.

BACKGROUND

The internet of things is an internet of connected things, which has two levels of meaning: first, the core and foundation of the internet of things are still internet, and it is extended and expanded based on internet; second, the user side of the internet of things is extended to any items, that is, the internet of things allows for information exchange and communications among any items.

In the prior art, with the development of intelligent terminals, more and more internet of things devices can be connected to and managed by the intelligent terminals. Specifically, manufactures of the internet of things devices provide control applications directed to different intelligent operation systems while manufacturing the internet of things devices, and the intelligent terminals may mange the internet of things devices after being installed with the control applications.

However, each internet of things device is corresponding to a control application specific thereto. As more and more internet of things devices are connected to the intelligent terminals, the number of the control applications that need to be installed with an intelligent terminal also increases, resulting in low efficiency of control of the intelligent terminals over the internet of things devices.

SUMMARY

Embodiments of the present invention provide a method and an apparatus for controlling internet of things devices to improve the efficiency of control of an intelligent terminal over the internet of things devices.

In one aspect, an embodiment of the present invention provides a method for controlling internet of things devices, including:

receiving a control instruction to control the internet of things devices sent by a control application, where the control instruction includes an identification number of the control application and identification numbers of a plurality of internet of things devices;

determining, according to the control instruction, whether the control application has authority to access the internet of things devices;

when it is determined that the control application has the authority to access the internet of things devices, sending the control instruction to the internet of things devices to enable the internet of things devices to execute the control instruction; and receiving a result of the execution of the control instruction by the internet of things devices, and sending the result to the control application.

In another aspect, an embodiment of the present invention provides an apparatus for controlling an internet of things device, including:

a receiving module, configured to receive a control instruction to control the internet of things devices sent by a control application, where the control instruction includes an identification number of the control application and identification numbers of a plurality of internet of things devices; and receive a result of execution of the control instruction by the internet of things devices;

a determining module, configured to determine, according to the control instruction, whether the control application has authority to access the internet of things devices;

a sending module, configured to: when it is determined that the control application has the authority to access the internet of things devices, send the control instruction to the internet of things devices to enable the internet of things devices to execute the control instruction; and send the result to the control application.

In still another aspect, an embodiment of the present invention provides an apparatus for controlling an internet of things device, including a memory storing instructions and a processor coupled with the memory and configured to execute instructions stored in the memory, where the processor is configured to:

receive a control instruction which is configured to control the internet of things devices and is sent by a control application, wherein the control instruction comprises an identification number of the control application and identification numbers of a plurality of internet of things devices; and receive a result of execution of the control instruction by the internet of things devices;

determine, according to the control instruction, whether the control application has authority to access the internet of things devices;

when it is determined that the control application has the authority to access the internet of things devices, send the control instruction to the internet of things devices to enable the internet of things devices to execute the control instruction; and send the result to the control application.

According to the method and the apparatus for controlling the internet of things device provided in embodiments of the present invention, a control instruction sent by one control application is sent to a plurality of internet of things devices indicated in the control instruction to instruct the plurality of internet of things devices to execute the control instruction, that is, one control application may simultaneously control a plurality of internet of things devices. Compared to a case where each internet of things device corresponds to a control application specific thereto, efficiency of control of an intelligent terminal over the internet of things devices is improved.

DESCRIPTION OF EMBODIMENTS

Figure 1:
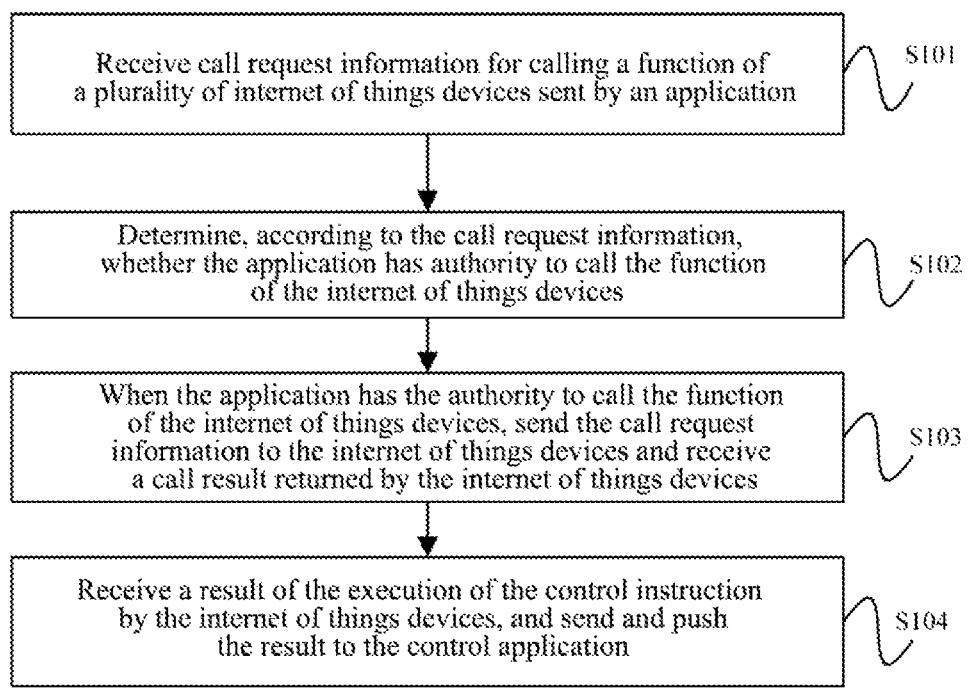
FIG. 1 is a flow chart of a method for controlling internet of things devices according to an embodiment of the present invention.
Figure 2:
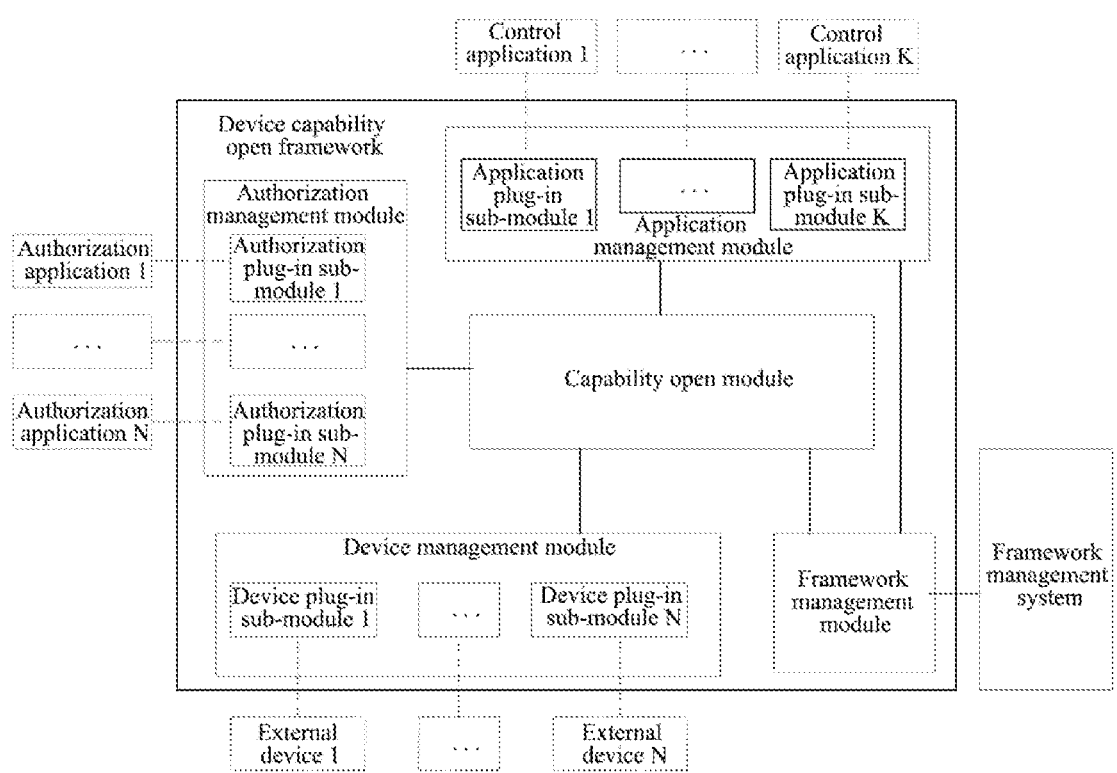
FIG. 2 is a schematic structural diagram of a device capability open framework according to an embodiment of the present invention.
Figure 3:
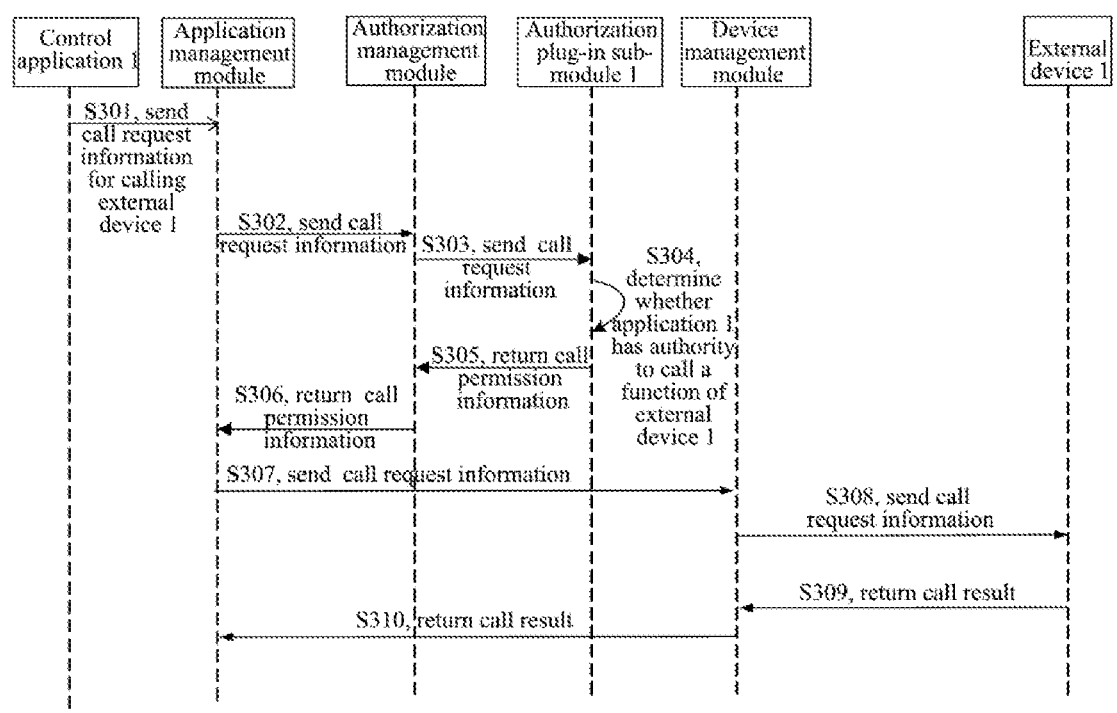
FIG. 3 is a signaling diagram of a method for controlling internet of things devices according to an embodiment of the present invention.

FIG. 1 is a flow chart of a method for controlling internet of things devices according to an embodiment of the present invention; FIG. 2 is a schematic structural diagram of a device capability open framework according to an embodiment of the present invention; FIG. 3 is a signaling diagram of a method for controlling internet of things devices according to an embodiment of the present invention.

As the number of internet of things devices connected to intelligent terminal increases, there is also an increase in the number of control applications that need to be installed with the intelligent terminal, resulting in a decrease in efficiency of management of the intelligent terminal over the internet of things devices, regarding to this, an embodiment of the present invention provides a method for controlling internet of things devices, specific steps of which are as follows:

Step S101, receive a control instruction which is configured to control internet of things devices and is sent by a control application, where the control instruction includes an identification number of the control application and identification numbers of a plurality of internet of things devices.

As shown in FIG. 2, an executive entity of an embodiment of the present invention is a device capability open framework. The device capability open framework is installed on an intelligent terminal as software, which is located on an operating system layer and an application layer of the intelligent terminal. The device capability open framework may be a standalone application in the intelligent terminal, or a built-in module of an application. Main function modules of the device capability open framework include: an authorization management module, a device management module, an application management module, a framework management module and a capability open module. The authorization management module may contain a plurality of authorization plug-in sub-modules. The device management module may contain a plurality of device plug-in sub-modules. The application management module may contain a plurality of application plug-in sub-modules.

The authorization management module interacts with external authorization applications through the authorization plug-in sub-modules to support authorization control of access to external devices. The authorization applications may be located on the intelligent terminal, or may be located outside the intelligent terminal (e.g., on the cloud). This document does not appoint a protocol and a method by which the authorization plug-in sub-modules interact with the external authorization applications. The authorization plug-in sub-modules are responsible for items such as protocol and data exchange between the authorization applications and the device capability open framework. The authorization applications and the authorization plug-in sub-modules are optional. In special cases, the device capability open framework may authorize an application to access any external device connected to the intelligent terminal, and at this point, the authorization management module processes, according to configuration of the device capability open framework and in a unified manner, requests for authorization on capabilities of control applications to access the external devices.

The device management module interacts with the external devices through the device plug-in sub-modules to support interactions of the control applications with the external devices. The external devices interact with the intelligent terminal through a particular protocol and a corresponding device plug-in sub-module. This document does not appoint a specific protocol by which the external devices interact with the device plug-in sub-modules of the intelligent terminal. The device plug-in sub-modules conduct items such as protocol and data conversion of the external devices and meet interaction requirements of the device management module.

The application management module interacts with control applications through application plug-in sub-modules. The control applications access external terminals of the intelligent terminal through the device capability open framework. The control applications have a one-to-one relationship with the application plug-in sub-modules, and one application plug-in sub-module serves one control application. The application management module manages individual application plug-in sub-modules in a unified manner, and the application plug-in sub-modules are generated by the application management module. When the control applications are connected to the capability open framework, the device capability open framework generates corresponding application plug-in sub-modules for the control applications (or use existing ones), and the generated application plug-in sub-modules are responsible for protocol and data conversion between them (the control applications and the device capability open framework).

The framework management module is responsible for items such as interaction with the framework management system and authority authentication of the control applications. When the control applications are connected to the device capability open framework, the application management module and the framework management module authenticate the control applications collaboratively and check their access authorizations.

The capability open module is a coordination center of the device capability open framework and is responsible for related operations such as scheduling access of the control applications to the external device.

The application management module receives a control instruction which is configured to control the internet of things device and is sent by a control application, where the control instruction includes an identification number of the control application and identification numbers of a plurality of internet of things devices; the control instruction herein is specifically a function call instruction through which the control application calls a certain function of the internet of things devices, and the application management module sends the function call instruction to the authorization management module.

Step S102, determine, according to the control instruction, whether the control application has authority to access the internet of things devices.

The authorization management module receives the function call instruction and determines, according to the function call instruction, whether the control application has authority to access the internet of things devices. Specifically, the authorization management module is stored with an access authorization list, which includes a plurality of entries. Each entry includes an identification number of the control application and identification numbers of the internet of things devices to which the control application has authority to access, and one control application may have authority to access a plurality of internet of things devices. The authorization management module queries the access authorization list according to the identification number of the control application and the identification numbers of the plurality of internet of things devices contained in the control instruction and determines whether the control application in the control instruction has authority to access the plurality of internet of things devices in the control instruction.

Step S103, when it is determined that the control application has the authority to access an internet of things devices, send the control instruction to the internet of things devices to enable the internet of things devices to execute the control instruction.

If the authorization management module determines that the control application has authority to access the plurality of internet of things devices indicated in the control instruction, then the control instruction is forwarded to the device management module. As shown in FIG. 2, the device management module is connected to the external devices through the device plug-in sub-modules, the external devices are specifically internet of things devices, and one device plug-in sub-module may be connected to a plurality of external devices. The device management module sends the control instruction to the external devices through the device plug-in sub-modules to enable the external devices to execute the control instruction.

Step S104, receive a result of the execution of the control instruction by the internet of things devices, and send the result to the control application.

Specifically, the control instruction is a function call instruction by which the control application calls a certain function of the external devices, the external devices perform the function call and return execution results to the device management module through the device plug-in sub-modules. The device management module returns the execution results to the application management module, the application management module returns the execution results to the control application through the application plug-in sub-module, where the application plug-in sub-modules correspond to the control applications one by one.

As shown in FIG. 3, the method for controlling internet of things devices provided in embodiments of the present invention has specific steps as follows:

Step S301, a control application 1 sends call request information for calling an external device 1 to an application management module;

Step S302, the application management module sends the call request information to an authorization management module;

Step S303, the authorization management module sends the call request information to an authorization plug-in sub-module 1;

Step S304, the authorization plug-in sub-module 1 determines whether the control application 1 has authority to call a function of the external device 1;

Step S305, when the control application 1 has the authority to call the function of the external device 1, the authorization plug-in sub-module 1 returns call permission information to the authorization management module;

Step S306, the authorization management module returns the call permission information to the application management module;

Step S307, the application management module sends the call request information to a device management module;

Step S308, the device management module sends the call request information to the external device 1;

Step S309, the external device 1 returns a call result to the device management module; and Step S310, the device management module returns the call result to the application management module.

In embodiments of the present invention, a control instruction sent by one control application is sent to a plurality of internet of things devices indicated in the control instruction to instruct the plurality of internet of things devices to execute the control instruction, that is, one control application may simultaneously control a plurality of internet of things devices, and compared to a case where each internet of things device is corresponding to a control application specific thereto, efficiency of control of an intelligent terminal over the internet of things devices is improved.

Figure 4:
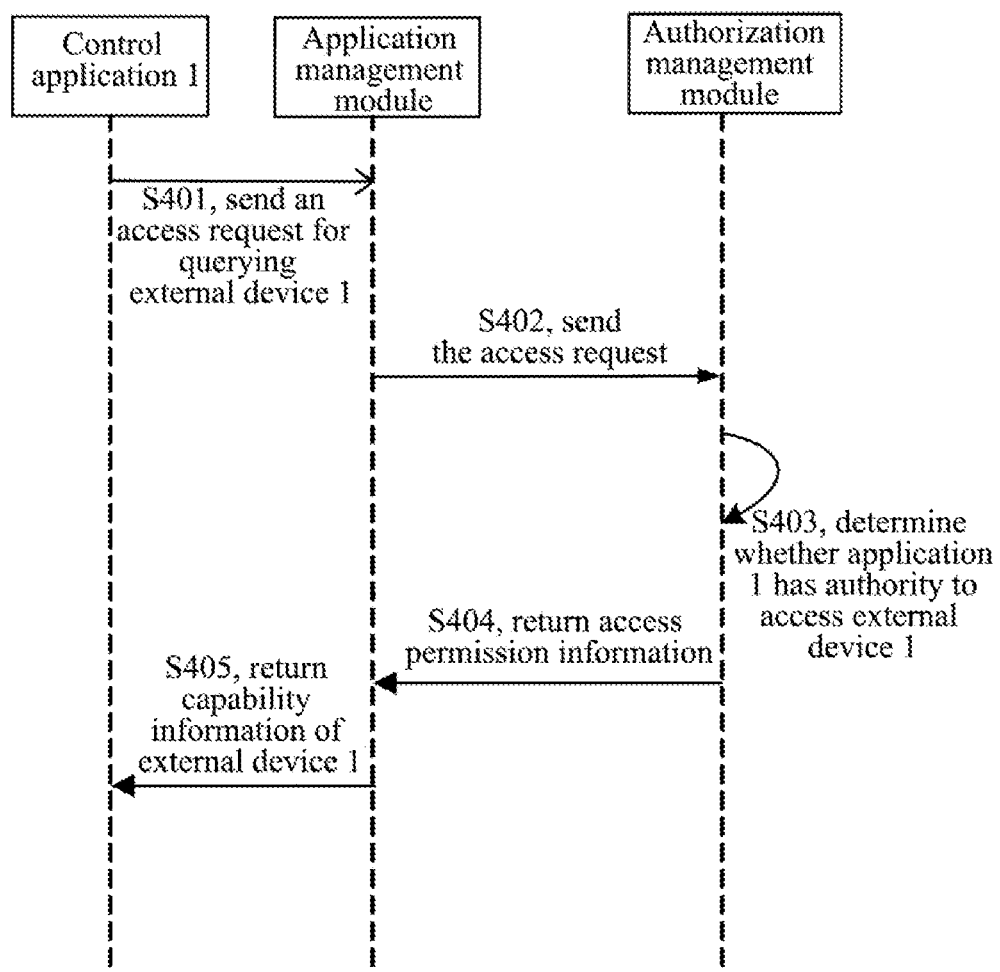
FIG. 4 is a signaling diagram of a method for controlling internet of things devices according to another embodiment of the present invention.

FIG. 4 is a signaling diagram of a method for controlling internet of things devices according to another embodiment of the present invention; based on the above-described embodiments, the control instruction includes a function call instruction and a function query instruction. The control instruction in the above-described embodiments is specifically the function call instruction, and the control instruction in this embodiment of the present invention is specifically the function query instruction.

As shown in FIG. 4, the method for controlling internet of things devices provided in this embodiment of the present invention has specific steps as follows:

Step S401, a control application 1 sends an access request for querying an external device 1 to an application management module;

Step S402, the application management module sends the access request to an authorization management module;

Step S403, the authorization management module determines whether the control application 1 has authority to access the external device 1;

Step S404, when the control application 1 has the authority to access the external device 1, the authorization management module returns access permission information to the application management module; and Step S405, the application management module returns capability information of the external device 1 to the control application 1.

Figure 5:
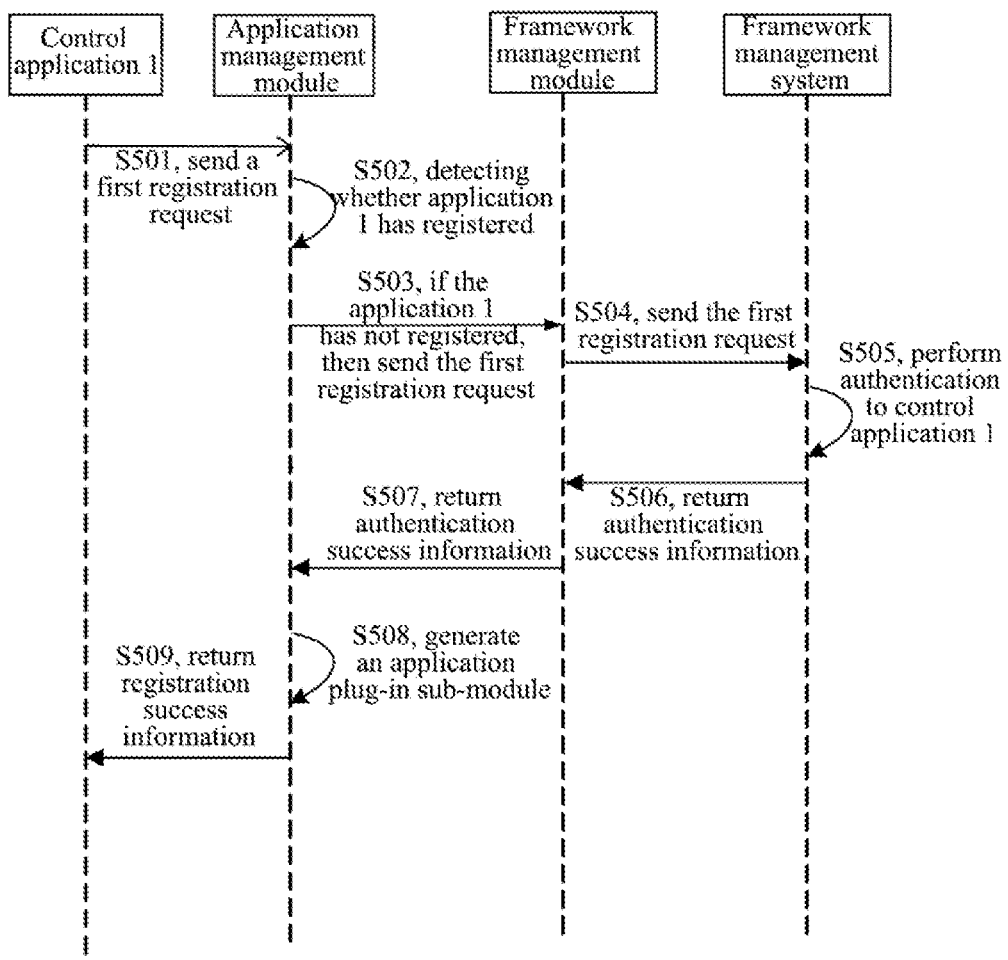
FIG. 5 is a signaling diagram of a method for controlling internet of things devices according to another embodiment of the present invention.

FIG. 5 is a signaling diagram of a method for controlling internet of things devices according to another embodiment of the present invention. Based on the above-described embodiments, before the receiving the control instruction which is configured to control the internet of things device and is sent by the control application, the method further includes: receive a first registration request sent by the control application, where the first registration request includes an authorized application certificate, an access authorization certificate and an identification number of the control application; and send the first registration request to a framework management system to enable the framework management system to perform an authentication to the control application according to the first registration request and historical registration information of the control application on the framework management system.

Figure 7:
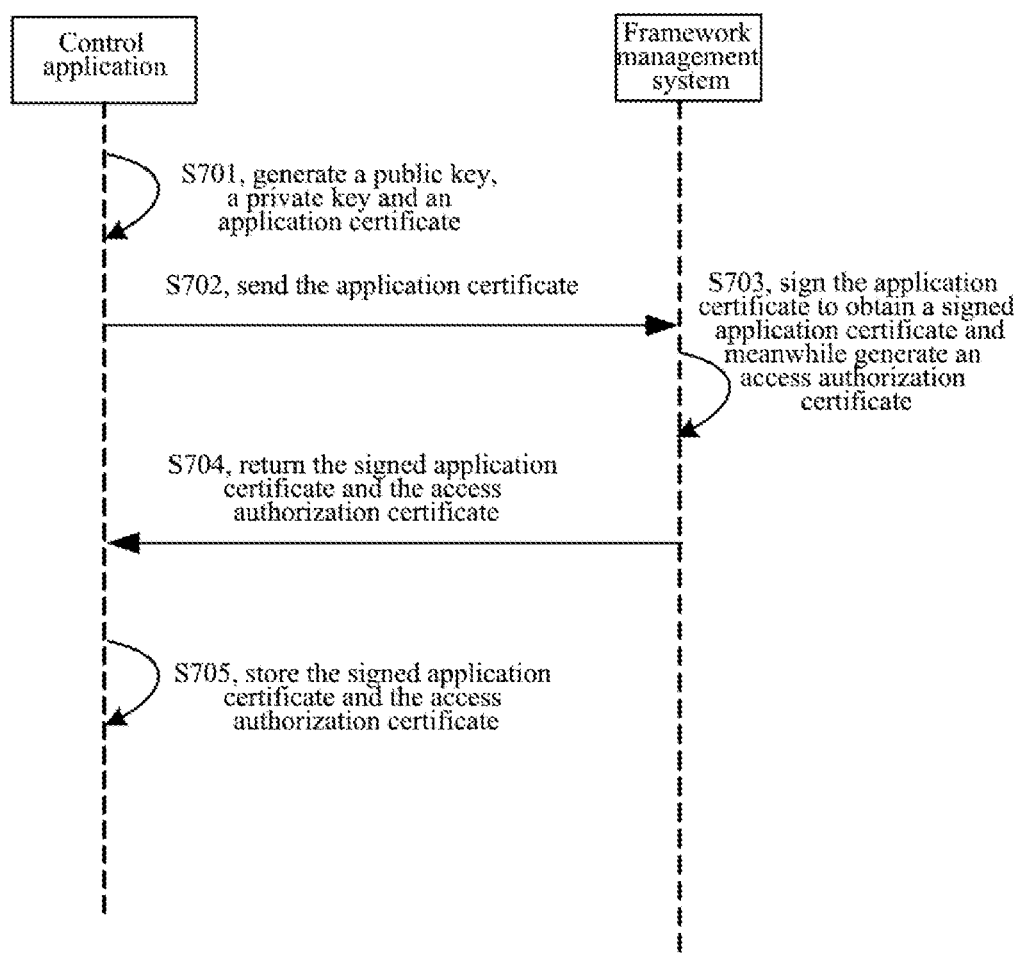
FIG. 7 is a signaling diagram of a method for controlling internet of things devices according to another embodiment of the present invention.

Specifically, the application management module receives a first registration request sent by the control application, where the first registration request includes an authorized application certificate, an access authorization certificate and an identification number of the control application. The application management module sends the first registration request to the framework management module, and the framework management module sends the first registration request to the framework management system. Before the application management module receives the first registration request sent by the control application, the control application needs to register to the frame management system to generate historical registration information. Reference may be made to FIG. 7 for a specific registration process, which will not be repeated herein. After receiving the first registration request, the framework management system determines whether the historical registration information of the control application on the framework management system is consistent with contents included in the first registration request; if being consistent, authentication of the control application passes; otherwise, authentication of the control application fails.

As shown in FIG. 5, the method for controlling internet of things devices provided in an embodiment of the present invention has specific steps as follows:

Step S501, a control application 1 sends a first registration request to an application management module;

Step S502, the application management module detects whether the control application 1 has registered;

Step S503, if the control application 1 has not registered, the application management module then sends the first registration request to a framework management module;

Step S504, the framework management module sends the first registration request to a framework management system;

Step S505, the framework management system performs an authentication to the control application 1;

Step S506, the framework management system returns authentication success information to the framework management module;

Step S507, the framework management module returns the authentication success information to the application management module;

Step S508, the application management module generates an application plug-in sub-module; and Step S509, the application management module returns registration success information to the control application 1.

Figure 6:
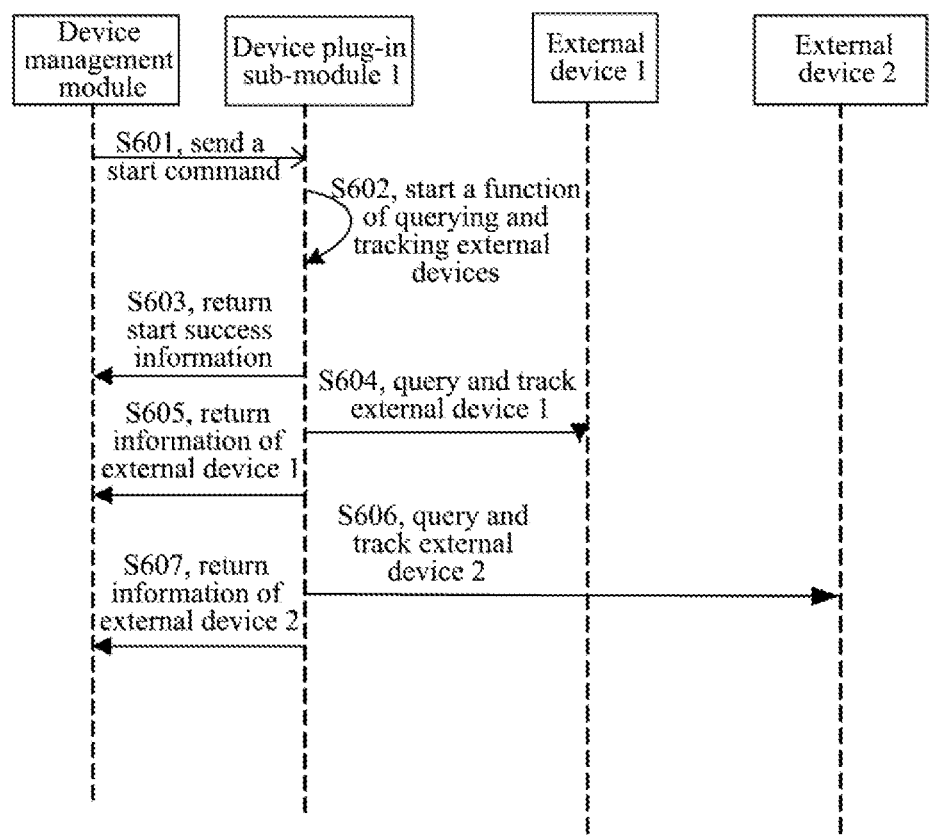
FIG. 6 is a signaling diagram of a method for controlling internet of things devices according to another embodiment of the present invention.

FIG. 6 is a signaling diagram of a method for controlling internet of things devices according to another embodiment of the present invention. Based on the above-described embodiments, before the receiving the control instruction which is configured to control the internet of things device and which is sent by the control application, the method further includes: receive and store a second registration request sent by an internet of things device, where the second registration request includes state information and parameter information of the internet of things device; and receive and store a third registration request sent by the internet of things device, where the third registration request includes device plug-in information and authorization plug-in information.

Specifically, a device plug-in sub-module may perform information interaction with an internet of things device, and a method for information exchange may be wired communications or wireless communications. The device plug-in sub-module receives a second registration request sent by the internet of things device, where the second registration request includes state information and parameter information of the internet of things device. The device plug-in sub-module sends the second registration request to the device management module, and the state information and the parameter information of the internet of things device are stored by the device management module; or, the device management module forwards the second registration request to the application management module, and the state information and the parameter information of the internet of things device are stored by the application management module. In addition, the device plug-in sub-module may also query and track external devices to obtain information of the external devices and return the information of the external devices to the device management module. In addition, the framework management module as shown in FIG. 2 receives and stores a third registration request sent by the internet of things device, where the third registration request includes device plug-in information and authorization plug-in information.

As shown in FIG. 6, the method for controlling internet of things devices provided in this embodiment of the present invention has specific steps as follows:

Step S601, the device management module sends a start command to the device plug-in sub-module 1;

Step S602, the device plug-in sub-module 1 starts a function of querying and tracking external devices;

Step S603, the device plug-in sub-module 1 returns start success information to the device management module;

Step S604, the device plug-in sub-module 1 queries and tracks an external device 1;

Step S605, the device plug-in sub-module 1 returns information of the external device 1 to the device management module;

Step S606, the device plug-in sub-module 1 queries and tracks an external device 2; and Step S607, the device plug-in sub-module 1 returns information of the external device 2 to the device management module.

FIG. 7 is a signaling diagram of a method for controlling internet of things devices according to another embodiment of the present invention. Based on the above-described embodiments, the control application needs to register information with the framework management system in advance. The framework management system is in particular a server, and a specific registration process is as follows:

Step S701, the control application generates a public key, a private key and an application certificate;

Step S702, the control application sends the application certificate to the framework management system;

Step S703, the framework management system signs the application certificate to obtain a signed application certificate and meanwhile generates an access authorization certificate;

Step S704, the framework management system returns the signed application certificate and the access authorization certificate to the control application; and Step S705, the control application stores the signed application certificate and the access authorization certificate.

In the embodiment of the present invention, a control instruction sent by one control application is sent to a plurality of internet of things devices indicated in the control instruction to instruct the plurality of internet of things devices to execute the control instruction, that is, one control application may simultaneously control a plurality of internet of things devices, and compared to a case where each internet of things device is corresponding to a control application specific thereto, efficiency of control of an intelligent terminal over the internet of things devices is improved.

Figure 8:
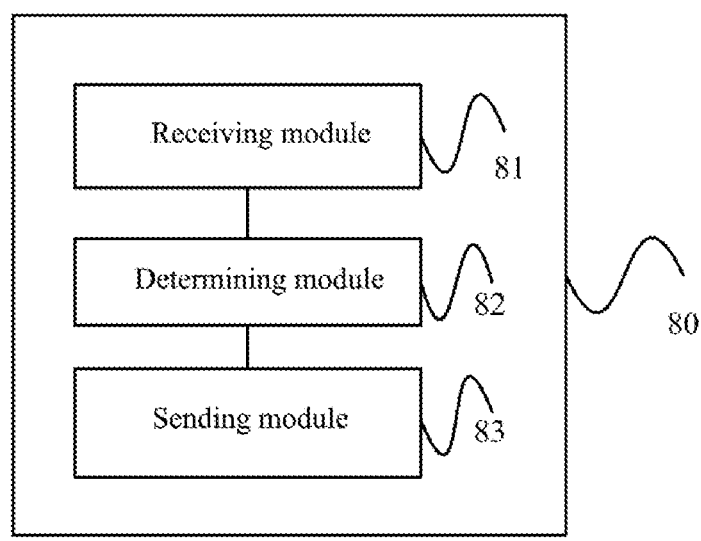
FIG. 8 is a schematic structural diagram of an apparatus for controlling internet of things devices according to an embodiment of the present invention.

FIG. 8 is a schematic structural diagram of an apparatus for controlling internet of things devices according to an embodiment of the present invention. The apparatus for controlling internet of things devices provided in this embodiment of the present invention may perform a processing flow provided in the embodiments of the method for controlling internet of things devices. As shown in FIG. 8, the apparatus for controlling internet of things devices 80 includes a receiving module 81, a determining module 82 and a sending module 83, where the receiving module 81 is configured to: receive a control instruction which is configured to control internet of things devices and is sent by a control application, where the control instruction includes an identification number of the control application and identification numbers of a plurality of internet of things devices; and receive a result of the execution of the control instruction by the internet of things device; the determining module 82 is configured to determine, according to the control instruction, whether the control application has authority to access the internet of things devices; and the sending module 83 is configured to: when it is determined that the control application has the authority to access an internet of things devices, send the control instruction to the internet of things devices to enable the internet of things devices to execute the control instruction; and send the result to the control application.

In the embodiment of the present invention, a control instruction sent by one control application is sent to a plurality of internet of things devices indicated in the control instruction to instruct the plurality of internet of things devices to execute the control instruction, that is, one control application may simultaneously control a plurality of internet of things devices, and compared to a case where each internet of things device is corresponding to a control application specific thereto, efficiency of control of an intelligent terminal over the internet of things devices is improved.

Figure 9:
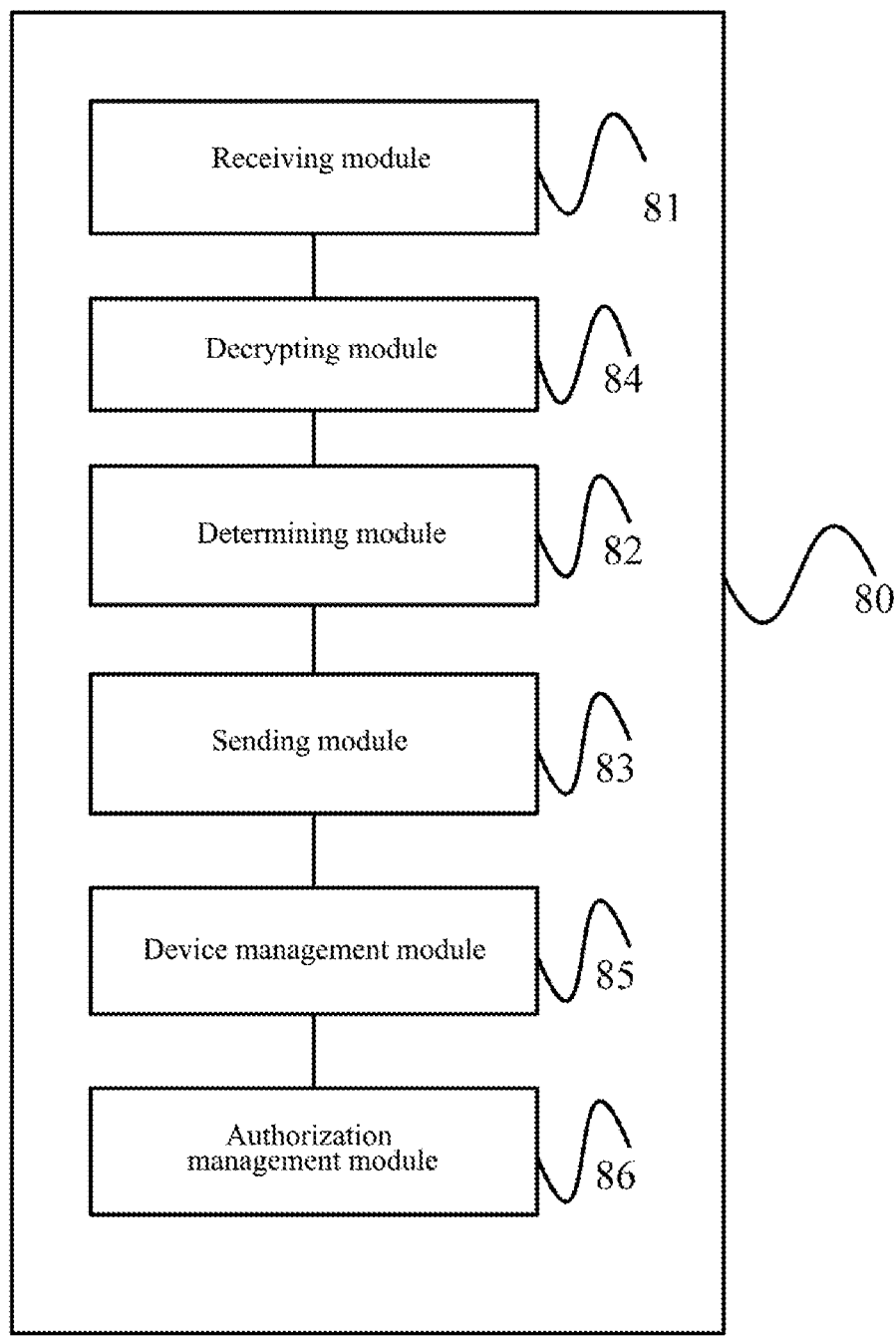
FIG. 9 is a schematic structural diagram of an apparatus for controlling internet of things devices according to another embodiment of the present invention.

FIG. 9 is a schematic structural diagram of an apparatus for controlling internet of things devices according to another embodiment of the present invention. Based on the above-described embodiments, the control instruction includes a function call instruction and a function query instruction.

The receiving module 81 is further configured to receive a first registration request sent by the control application, where the first registration request includes an authorized application certificate, an access authorization certificate and an identification number of the control application. The sending module 83 is further configured to send the first registration request to a framework management system to enable the framework management system to perform an authentication to the control application according to the first registration request and historical registration information of the control application on the framework management system.

The receiving module 81 is further configured to: receive and store a second registration request sent by an internet of things device, where the second registration request includes state information and parameter information of the internet of things device; and receive and store a third registration request sent by the internet of things device, where the third registration request includes device plug-in information and authorization plug-in information.

The control instruction is an instruction encrypted by the control application; the apparatus for controlling internet of things devices 80 further includes a decrypting module 84, a device management module 85 and an authorization management module 86, where the decrypting module 84 is configured to decrypt the control instruction which is configured to control the internet of things device and is sent by the control application; the device management module 85 interacts with the internet of things device through a device plug-in and is configured to send the control instruction to the internet of things device and receive a result of the execution of the control instruction by the internet of things device; and the authorization management module 86 interacts with an authorization application through an authorization plug-in and is configured to determine whether the control application is an authorized application.

The apparatus for controlling internet of things devices provided in the embodiment of the present invention may be, in particular, configured to perform the method embodiment provided in FIG. 1 above, and a specific function will not be repeated herein.

In the embodiment of the present invention, a control instruction sent by one control application is sent to a plurality of internet of things devices indicated in the control instruction to instruct the plurality of internet of things devices to execute the control instruction, that is, one control application may simultaneously control a plurality of internet of things devices, and compared to a case where each internet of things device is corresponding to a control application specific thereto, efficiency of control of an intelligent terminal over the internet of things devices is improved.

To sum up, in the embodiments of the present invention, a control instruction sent by one control application is sent to a plurality of internet of things devices indicated in the control instruction to instruct the plurality of internet of things devices to execute the control instruction, that is, one control application may simultaneously control a plurality of internet of things devices, and compared to a case where each internet of things device is corresponding to a control application specific thereto, efficiency of control of an intelligent terminal over the internet of things devices is improved.

In several embodiments provided by the present invention, it would be appreciated that the disclosed apparatus and method may be implemented in other ways. For example, the apparatus embodiments described above are just exemplary. For example, the division of the units is just a logical function division, and other approaches for division may be employed in practical implementations. For example, a plurality of units or components may be combined or integrated to another system, or some features may be omitted or not executed. Another point is that the shown or discussed mutual coupling, direct coupling or communication connection may be the indirect coupling or communication connection through some interfaces, apparatuses or units, which may be electrical, mechanical or in other forms.

The units described as separate components may be or may not be physically separated. The parts shown as units may be or may not be physical units, that is, may be located at the same place or distributed on a plurality of network units. According to actual demands, some or all of the units may be selected to achieve objectives of the solutions of the embodiments.

In addition, various function units in respective embodiments of the present invention may be integrated into one processing unit or existed as individual physical units, or two or more units may be integrated into one unit. The integrated unit may be implemented in the form of hardware or may be implemented in the form of hardware plus software function unit.

The integrated unit which is implemented in the form of software function unit may be stored in a computer readable storage medium. The described software function unit is stored in a storage medium which includes several instructions to enable a computer device (e.g., a personal computer, a server, a network facility or the like) or a processor to execute a part of steps of the method described in the embodiments of the present invention. The described storage medium includes various mediums capable of storing program codes, such as a USB flash disk, a mobile hard disk, a read-only memory (Read-Only Memory, ROM), a random access memory (Random Access Memory, RAM), a magnetic disc, an optical disc or the like.

It may be clearly understood by persons skilled in the art that, for the purpose of convenient and brief description, division of the described function modules is merely described for illustrations, and in practical use, the described functions may be assigned to different function modules for implementations as desired, that is, the internal structure of the apparatus is divided into different function modules to implement all or a part of functions as described above. For a detailed working process of the described apparatus, reference may be made to corresponding processes in the foregoing method embodiments, and details will not be described herein.

Finally, it should be noted that the foregoing embodiments are merely intended for describing the technical solutions of the present invention other than limiting the present invention. Although the present invention is described in detail with reference to the foregoing embodiments, persons of ordinary skills in the art should understand that they may still make modifications to the technical solutions described in the foregoing embodiments or make equivalent replacements to some or all technical features therein; while these modifications or replacements will not make the essence of the corresponding technical solutions depart from the scope of the technical solutions of the embodiments of the present invention.

What is claimed is:

1. A method applied in a terminal device for controlling internet of things devices, comprising:
receiving, by a framework installed on the terminal device, a control instruction which is sent by a control application installed on the terminal device, wherein the control instruction comprises an identification number of the control application and identification numbers of a plurality of internet of things devices;
determining, by the framework, according to the control instruction, whether the control application has authority to access the plurality of internet of things devices;
when it is determined that the control application has the authority to access the plurality of internet of things devices, sending, by the framework, the control instruction to the plurality of internet of things devices to enable the plurality of internet of things devices to execute the control instruction, whereby the control application simultaneously controls the plurality of internet of things devices; and
receiving, by the framework, results of the execution of the control instruction from the plurality of internet of things devices, and sending the results to the control application.

2. The method according to claim 1, wherein, the control instruction comprises a function call instruction and a function query instruction.

3. The method according to claim 2, before the receiving, by the framework, the control instruction which is sent by the control application, further comprising:
receiving, by the framework, a first registration request sent by the control application, wherein the first registration request comprises an authorized application certificate, an access authorization certificate and the identification number of the control application; and
sending, by the framework, the first registration request to a framework management system to enable the framework management system to perform an authentication to the control application according to the first registration request and historical registration information of the control application on the framework management system.

4. The method according to claim 2, before the receiving, by the framework, the control instruction which is sent by the control application, further comprising:
receiving and storing, by the framework, a second registration request sent by an internet of things device, wherein the second registration request comprises state information and parameter information of the internet of things device; and
receiving and storing, by the framework, a third registration request sent by the internet of things device, wherein the third registration request comprises device plug-in information and authorization plug-in information.

5. The method according to claim 1, wherein, the control instruction is an instruction encrypted by the control application; and
wherein the receiving, by the framework, the control instruction which is sent by the control application comprises:
receiving and decrypting, by the framework, the control instruction which is sent by the control application.

6. A terminal device, wherein the terminal device comprises:
a memory storing instructions; and
a processor coupled with the memory, and configured to execute instructions stored in the memory to perform:
receiving, by a framework installed on the terminal device, a control instruction which is sent by a control application installed on the terminal device, wherein the control instruction comprises an identification number of the one control application and identification numbers of a plurality of internet of things devices;
determining, by the framework, according to the control instruction, whether the control application has authority to access the internet of things devices;
when it is determined that the control application has the authority to access the plurality of internet of things devices, sending, by the framework, the control instruction to the plurality of internet of things devices to enable the plurality of internet of things devices to execute the control instruction, whereby the control application simultaneously controls the plurality of internet of things devices; and receiving, by the framework, results of execution of the control instruction from the plurality of internet of things devices, and sending the results to the control application.

7. The terminal device according to claim 6, wherein, the control instruction comprises a function call instruction and a function query instruction.

8. The terminal device according to claim 7, wherein the processor is further configured to perform:

receiving, by the framework, a first registration request sent by the control application, wherein the first registration request comprises an authorized application certificate, an access authorization certificate and the identification number of the control application; and sending, by the framework the first registration request to a framework management system to enable the framework management system to perform an authentication to the control application according to the first registration request and historical registration information of the control application on the framework management system.

9. The terminal device according to claim 7, wherein the processor is further configured to perform:

receiving and storing, by the framework, a second registration request sent by an internet of things device, wherein the second registration request comprises state information and parameter information of the internet of things device; and receiving and storing, by the framework, a third registration request sent by the internet of things device, wherein the third registration request comprises device plug-in information and authorization plug-in information.

10. The terminal device according to claim 6, wherein, the control instruction is an instruction encrypted by the control application; and wherein the processor is further configured to perform:

decrypting the control instruction which is sent by the control application;

interacting with the plurality of internet of things devices through at least one device plug-in, sending the control instruction to the plurality of internet of things devices and receiving results of the execution of the control instruction from the plurality of internet of things devices; and interacting with an authorization application through an authorization plug-in, and determine whether the control application is an authorized application.

* * * * *